United States Patent
Landreau et al.

(10) Patent No.: US 11,866,578 B2
(45) Date of Patent: Jan. 9, 2024

(54) RUBBER COMPOSITION BASED ON EPOXY RESIN, AN AMINE HARDENER AND AN IMIDAZOLE

(71) Applicant: COMPAGNIE GENERALE DES ETABLISSEMENTS MICHELIN, Clermont-Ferrand (FR)

(72) Inventors: Emmanuel Landreau, Clermont-Ferrand (FR); Etienne Fleury, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 320 days.

(21) Appl. No.: 17/276,637

(22) PCT Filed: Sep. 12, 2019

(86) PCT No.: PCT/FR2019/052117
§ 371 (c)(1),
(2) Date: Mar. 16, 2021

(87) PCT Pub. No.: WO2020/058604
PCT Pub. Date: Mar. 26, 2020

(65) Prior Publication Data
US 2022/0041843 A1    Feb. 10, 2022

(30) Foreign Application Priority Data
Sep. 17, 2018  (FR) .......................................  1858347

(51) Int. Cl.
*C08L 7/00*   (2006.01)
*B60C 1/00*   (2006.01)

(52) U.S. Cl.
CPC .............. *C08L 7/00* (2013.01); *B60C 1/0016* (2013.01); *C08L 2312/00* (2013.01)

(58) Field of Classification Search
CPC ..................................... C08L 7/00; B60C 1/00
USPC ......................................................... 524/106
See application file for complete search history.

(56) References Cited

U.S. PATENT DOCUMENTS

| | | | |
|---|---|---|---|
| 5,140,055 A * | 8/1992 | Hirata | ................... B60C 1/0016 524/106 |
| 6,610,261 B1 | 8/2003 | Custodero et al. | |
| 6,747,087 B2 | 6/2004 | Custodero et al. | |
| 7,199,175 B2 | 4/2007 | Vasseur | |
| 7,250,463 B2 | 7/2007 | Durel et al. | |
| 7,900,667 B2 | 3/2011 | Vasseur | |
| 8,877,839 B2 | 11/2014 | Veyland et al. | |
| 2003/0212185 A1 | 11/2003 | Vasseur | |
| 2005/0004297 A1 | 1/2005 | Durel et al. | |
| 2007/0112120 A1 | 5/2007 | Vasseur | |
| 2012/0283360 A1 | 11/2012 | Veyland et al. | |
| 2017/0267809 A1 | 9/2017 | Meyer et al. | |
| 2019/0241722 A1 * | 8/2019 | Landreau | ................... C08L 7/00 |
| 2021/0179819 A1 | 6/2021 | Belin et al. | |

FOREIGN PATENT DOCUMENTS

| | | |
|---|---|---|
| CN | 104884521 A | 9/2015 |
| CN | 107041142 A | 8/2017 |
| EP | 0649446 A1 | 4/1995 |
| JP | 5-50558 A | 3/1993 |
| JP | 2007-269658 A | 10/2007 |
| JP | 2012-211122 A | 11/2012 |
| WO | 97/36724 A2 | 10/1997 |
| WO | 99/16600 A1 | 4/1999 |
| WO | 02/10269 A2 | 2/2002 |
| WO | 03/016387 A1 | 2/2003 |
| WO | 2011/045342 A1 | 4/2011 |
| WO | 2014/095588 A1 | 6/2014 |
| WO | 2018/002538 A1 | 1/2018 |
| WO | WO-2018002538 A1 * | 1/2018 ............... B60C 1/00 |

OTHER PUBLICATIONS

International Search Report dated Nov. 5, 2019, in corresponding PCT/FR2019/052117 (4 pages).
M.R. Grimmett, "Product Class 3: Imidazoles", Science of Synthesis, vol. 12, pp. 325-528 (2002).
S. Brunauer, et al., "Adsorption of Gases in Multimolecular Layers", J. Am. Chem. Soc., vol. 60, pp. 309-319 (1938).

* cited by examiner

*Primary Examiner* — Deve V Hall
(74) *Attorney, Agent, or Firm* — VENABLE LLP

(57) ABSTRACT

A rubber composition is based on at least a diene elastomer, a reinforcing filler, a crosslinking system, an epoxy resin, an amine hardener comprising at least two primary amine functions, located on at least one six-membered aromatic ring, and an imidazole.

15 Claims, No Drawings

RUBBER COMPOSITION BASED ON EPOXY RESIN, AN AMINE HARDENER AND AN IMIDAZOLE

FIELD OF THE INVENTION

The present invention relates to rubber compositions intended in particular for the manufacture of tyres or of semi-finished products for tyres. A subject of the present invention is also a finished or semi-finished rubber article comprising a rubber composition according to the invention, and also a tyre comprising at least one composition according to the invention.

PRIOR ART

It is known practice to use, in some parts of tyres, rubber compositions exhibiting a high stiffness during small strains of the tyre, as presented in Application WO 02/10269. Resistance to small strains is one of the properties which a tyre has to exhibit in order to respond to the stresses to which it is subjected.

This stiffening can be obtained by increasing the content of reinforcing filler or by incorporating certain reinforcing resins in the constituent rubber compositions of the parts of the tyre.

The reinforcing resins conventionally used to increase the stiffness of the compositions are reinforcing resins based on a methylene acceptor/donor system. The terms "methylene acceptor" and "methylene donor" are well known to those skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulfur network, on the other hand (if the crosslinking agent is sulfur). Conventionally, the methylene acceptor is a phenolic resin. Phenolic novolac resins have already been described in rubber compositions, intended in particular for tyres or tyre treads, for applications as varied as adhesion or reinforcement: reference will be made, for example, to Patent EP 0 649 446.

The methylene acceptor described above is combined with a hardener, capable of crosslinking or hardening it, also commonly known as "methylene donor". Crosslinking of the resin is then brought about, during the curing of the rubber matrix, by formation of methylene bridges between the carbons in the ortho and para positions of the phenolic rings of the resin and the methylene donor, thus creating a three-dimensional resin network. The methylene donors conventionally used are hexamethylenetetramine (abbreviated to HMT) or hexamethoxymethylmelamine (abbreviated to HMMM or H3M) or hexaethoxymethylmelamine.

However, the combination of a phenolic resin, methylene acceptor, with HMT or H3M, methylene donor, produces formaldehyde during the crosslinking of the rubber composition. In point of fact, it is desirable to reduce, indeed even to eliminate, in the long run, formaldehyde from rubber compositions due to the potential environmental impact of these compounds.

To this end, alternative compositions to the conventional compositions comprising the pair of phenol-formaldehyde resin, methylene acceptor, with an HMT or H3M hardener, methylene donor, have been developed. By way of example, Application WO 2011/045342 describes compositions comprising an epoxy resin pair with an amine hardener. These compositions, in addition to the advantage of being freed from the formation of formaldehyde, exhibit, after crosslinking, greater stiffnesses than conventional compositions while retaining an acceptable rolling resistance. Application WO 2018/002538 describes compositions comprising an epoxy resin and an amine hardener which aims to improve the processability (in particular the scorch time)/stiffness compromise compared to known compositions.

However, it is still desirable to be able to adjust the stiffness of the rubber compositions over all of the operating temperatures of the tyre.

Unexpectedly, the applicant has discovered, during its research studies, that the combination of an epoxy resin, an amine hardener and an imidazole makes it possible to be freed from the formation of formaldehyde while maintaining the stiffness properties at the various operating temperatures of the tyre, or even while improving them.

DEFINITIONS

For the purposes of the present invention, the expression "part by weight per hundred parts by weight of elastomer" (or phr) should be understood as meaning the part by weight per hundred parts by weight of elastomer or rubber.

In the present document, unless expressly indicated otherwise, all the percentages (%) indicated are percentages (%) by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. On the contrary, a "minor" compound is a compound which does not represent the greatest fraction by weight among the compounds of the same type. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biobased. In the latter case, they may be derived, partially or completely, from biomass or be obtained from renewable starting materials derived from biomass. Polymers, plasticizers, fillers, and the like, are concerned in particular.

DESCRIPTION OF THE INVENTION

Diene Elastomer

The composition according to the invention comprises at least one diene elastomer. It may therefore contain just one diene elastomer or a mixture of several diene elastomers.

A "diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). The diene elastomers included in the composition according to the invention are preferentially essentially unsaturated.

"Diene elastomer capable of being used in the compositions in accordance with the invention" is understood particularly to mean:
 (a) any homopolymer of a conjugated or non-conjugated diene monomer having from 4 to 18 carbon atoms;
 (b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Preferably, the diene elastomer is an isoprene elastomer.

"Isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably selected from the group consisting of natural rubber or synthetic cis-1,4-polyisoprenes and mixtures thereof; use is preferably made, among these synthetic polyisoprenes, of polyisoprenes having a content (mol %) of cis-1,4-bonds of greater than 90%, more preferentially still of greater than 98%. Preferably and according to any one of the arrangements of the present document, the diene elastomer is natural rubber.

Preferentially, the content of diene elastomer, preferably of isoprene elastomer, preferably natural rubber, is from 50 to 100 phr, more preferentially from 60 to 100 phr, in a more preferential way from 70 to 100 phr, more preferentially still from 80 to 100 phr and very preferentially from 90 to 100 phr. In particular, the content of diene elastomer, preferably of isoprene elastomer, preferably again of natural rubber, is very preferentially 100 phr.

Whether it contains just one diene elastomer or a mixture of several diene elastomers, the rubber composition according to the invention can also contain, in a minor way, any type of synthetic elastomer other than a diene elastomer, indeed even polymers other than elastomers, for example thermoplastic polymers. Preferably, the rubber composition according to the invention does not contain a synthetic elastomer other than a diene elastomer or a polymer other than elastomers or contains less than 10 phr, preferably less than 5 phr, thereof.

Epoxy Resin

The epoxy resins which can be used in the present invention include all the polyepoxide compounds. They can concern, for example, aromatic epoxy, alicyclic epoxy and aliphatic epoxy resins. For example, the aromatic epoxy resin can be an amine-aromatic epoxy resin. The epoxy resins are preferentially epoxy novolac resins, that is to say epoxy resins obtained by acid catalysis, in contrast to resol resins, which are obtained by basic catalysis.

In particular among aromatic epoxy resins, preference is given to epoxy resins selected from the group consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)], amine aromatic epoxy resins and the mixtures of these compounds, and preferably epoxy resins selected from the group consisting of poly[(o-cresyl glycidyl ether)-co-formaldehyde, and poly[(phenyl glycidyl ether)-co(hydroxybenzaldehyde glycidyl ether)].

More preferably, the epoxy resin is selected from the group consisting of poly[(o-cresyl glycidyl ether)-co-formaldehyde], poly[(o-phenyl glycidyl ether)-co-formaldehyde], amine aromatic epoxy resins and the mixtures of these compounds.

Mention may be made, as examples of commercially available epoxy resins which can be used in the context of the present invention, for example, of the epoxy resin DEN 439 from Uniqema, the epoxy resin tris(4-hydroxyphenyl) methane triglycidyl ether from Sigma-Aldrich or the epoxy cresol novolac resin Araldite ECN 1299 from Huntsman.

The composition according to the invention comprises between 1 and 30 phr of epoxy resin. In view of the amine hardener used in the context of the present invention, below the minimum content of resin indicated, the targeted technical effect is insufficient whereas, above the maximum indicated, risks arise of an excessively great increase in the stiffness and of excessive damage to the hysteresis and to the extensibility properties of the material. For all these reasons, the content of epoxy resin is preferentially between 10 and 25 phr. Preferably again, the content of epoxy resin in the composition according to the invention is between 10 and 20 phr.

Amine Hardener

The epoxy resin of the composition of the invention is combined with a specific amine hardener which enables the crosslinking of the resin.

According to the invention, the amine hardener comprises at least two primary amine functions, located on at least one (that is to say, one or more) six-membered aromatic ring, said at least one six-membered aromatic ring comprising:
- at least one primary amine function, and
- at least two Ri radicals, which are identical or different, selected from the group consisting of linear or branched C1-C6 alkyl radicals, halogens and ethers, tertiary amines, thioethers, ketones, esters and amides, substituted by linear or branched C1-C6 alkyl radicals, so that the at least one six-membered aromatic ring does not comprise a hydrogen atom located in the ortho position with respect to the primary amine functions.

In other words, the amine hardener comprises one or more six-membered aromatic rings and at least two primary amine functions, located on just one or distributed over several of these six-membered aromatic rings.

In a manner well known to a person skilled in the art, a primary amine function is understood to mean an amine function in which the nitrogen atom is bonded to two hydrogen atoms.

Preferably, the amine hardener comprises from 1 to 3, more preferably 1 or 2 six-membered aromatic rings.

Preferably, the amine hardener comprises from 2 to 4, more preferably 2 primary amine functions located on at least one six-membered aromatic ring of the amine hardener.

Mention may be made, among the halogens capable of constituting the Ri radicals, of fluorine, chlorine, bromine or iodine atoms. Preferably, the halogens are selected from the group consisting of chlorine and bromine atoms, more preferably the halogens are chlorine atoms.

According to a first embodiment of the present invention, the amine hardener may comprise a six-membered aromatic ring comprising:
- at least two primary amine functions, and
- at least two Ri radicals, which are identical or different, selected from the group consisting of linear or branched C1-C6 alkyl radicals, halogens and ethers, tertiary amines, thioethers, ketones, esters and amides, substituted by linear or branched C1-C6 alkyl radicals, so that said ring does not comprise a hydrogen atom located in the ortho position with respect to the primary amine functions.

According to a second embodiment of the present invention, the amine hardener may also comprise at least two six-membered aromatic rings, which are identical or different, said rings each comprising:
- at least one primary amine function, and
- at least two Ri radicals, which are identical or different, selected from the group consisting of linear or branched C1-C6 alkyl radicals, halogens and ethers, tertiary amines, thioethers, ketones, esters and amides, substituted by linear or branched C1-C6 alkyl radicals, so that said rings do not comprise a hydrogen atom located in the ortho position with respect to the primary amine functions.

According to another embodiment, the amine hardener may also comprise several six-membered aromatic rings and at least two primary amine functions located solely on one of the aromatic rings.

When the amine hardener comprises several (i.e. at least two) six-membered aromatic rings, these rings may be identical or different. They may for example differ from one another in the nature of the atoms constituting said rings and/or in the number of primary amine functions located on said rings and/or in the nature and/or the number of the Ri radicals positioned on said rings and/or in the position of the primary amine functions and Ri radicals on said rings. Preferably, when the amine hardener comprises several six-membered aromatic rings, these rings are identical.

As indicated above, the amine hardener comprises at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals. In the expression "ethers, tertiary amines, thioethers, ketones, esters and amides, substituted by linear or branched $C_1$-$C_6$ alkyl radicals", a person skilled in the art clearly understands that the terms "substituted by linear or branched $C_1$-$C_6$ alkyl radicals" relate to each of the ethers, tertiary amines, thioethers, ketones, esters and amides.

Whatever the embodiment of the present invention, the amine hardener preferentially comprises at least two Ri radicals, which are identical or different, selected from the group consisting of linear or branched $C_1$-$C_6$ alkyl radicals, halogens, and ethers, tertiary amines and thioethers, substituted by linear or branched $C_1$-$C_6$ alkyl radicals. More preferably, the amine hardener comprises at least two Ri radicals, which are identical or different, selected from the group consisting of linear or branched $C_1$-$C_6$ alkyl radicals, halogens and thioethers, substituted by linear or branched $C_1$-$C_6$ alkyl radicals.

Whatever the embodiment of the present invention, the Ri radicals, which are identical or different, are very preferentially selected from the group consisting of the linear or branched $C_1$-$C_6$ alkyl radicals. In other words, all the Ri radicals of the amine hardener may be linear or branched $C_1$-$C_6$ alkyl radicals, the linear or branched $C_1$-$C_6$ alkyl radicals preferably being selected from the group consisting of the methyl, ethyl and propyl radicals.

Whatever the embodiment of the present invention, the at least one six-membered aromatic ring of the amine hardener may comprise at least two Ri radicals, which are identical or different, selected from the group consisting of halogens, and ethers, tertiary amines and thioethers, substituted by linear or branched $C_1$-$C_6$ alkyl radicals, and at least one Ri radical selected from the group consisting of linear or branched $C_1$-$C_6$ alkyl radicals.

Whatever the embodiment of the present invention, whether the Ri radicals or the radicals of the ethers, tertiary amines, thioethers, ketones, esters or amides are concerned, the linear or branched $C_1$-$C_6$ alkyl radicals may be selected from the group consisting of the methyl, ethyl, propyl, isopropyl, isobutyl and butyl radicals. Preferably, the linear or branched $C_1$-$C_6$ alkyl radicals are selected from the group consisting of the methyl, ethyl and propyl radicals. More preferably, the linear or branched $C_1$-$C_6$ alkyl radicals are selected from the group consisting of the methyl and ethyl radicals.

Whatever the embodiment of the present invention, the atoms of the aromatic rings of the amine hardener may be carbon atoms, and may optionally comprise nitrogen atoms. Preferably, all the atoms of the aromatic rings of the amine hardener are carbon atoms. In other words, the six-membered aromatic rings of the amine hardener are preferentially aromatic rings comprising six carbon atoms.

In the formulae (I) to (V) presented below, it should be remembered that the Ri radicals can be identical or different.

According to one embodiment of the present invention, the amine hardener corresponds to the formula (I):

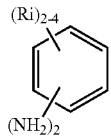

(I)

Preferably, according to this embodiment, the amine hardener corresponds to the formula (II):

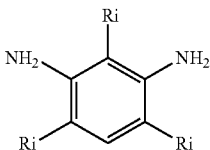

(II)

According to another embodiment of the present invention, the amine hardener corresponds to the formula (III):

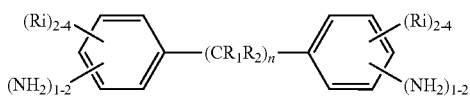

(III)

in which
n represents an integer ranging from 0 to 4, preferably from 1 to 3,
$R_1$ and $R_2$, which are identical or different, are selected from the group consisting of a hydrogen atom and a methyl, ethyl, isobutyl or benzyl group; preferably, $R_1$ and $R_2$ both represent a hydrogen atom.

Preferably, according to this embodiment, the amine hardener corresponds to the formula (IV):

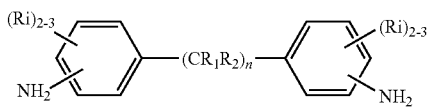

(IV)

in which:
n represents 1 or 2, preferably 1,
$R_1$ and $R_2$, which are identical or different, are selected from the group consisting of a hydrogen atom and a methyl, ethyl, isobutyl or benzyl group; preferably, $R_1$ and $R_2$ both represent a hydrogen atom.

More preferably, according to this embodiment, the amine hardener corresponds to the formula (V):

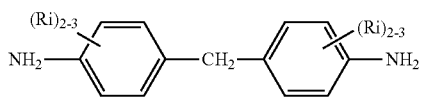

(V)

Very preferentially, according to the invention, the amine hardener is selected from the group consisting of the compounds below and the mixtures of these compounds:

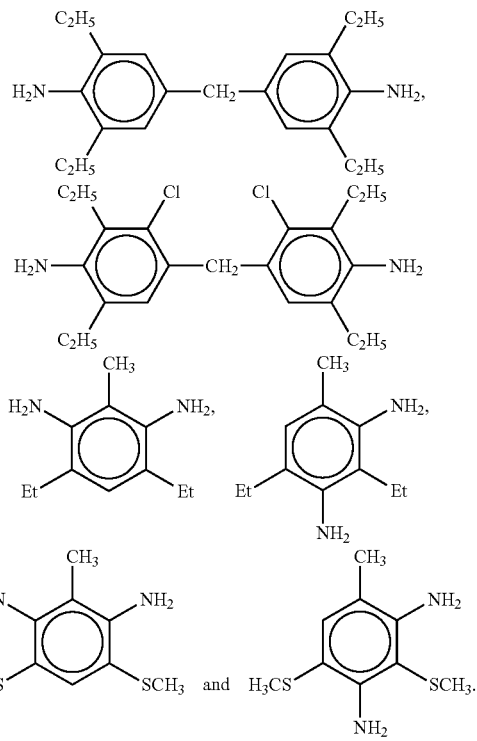

Mention may be made, as examples of commercially available amine hardeners which can be used in the context of the present invention, for example, of Ethacure 100 or Ethacure 300 from Albemarle or Lonzacure DETDA, Lonzacure MDEA or Lonzacure MCDEA from Lonza.

The amount of amine hardener is between 1 and 15 phr. Below the minimum indicated, the targeted technical effect has proved to be insufficient whereas, above the maximum indicated, risks arise of the processing in the raw state of the compositions being disadvantaged. Preferentially, the content of amine hardener is within a range extending from 5 to 10 phr, preferably from 2 to 8 phr.

Imidazole

The composition according to the invention comprises an imidazole of general formula (A)

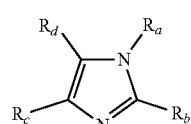

(A)

in which,
$R_a$ represents a hydrogen atom or a hydrocarbon group, optionally interrupted by one or more heteroatoms and/or substituted,
$R_b$ represents a hydrocarbon group,
$R_c$ and $R_d$ represent, independently of one another, a hydrogen atom or a hydrocarbon group, optionally interrupted by one or more heteroatoms and/or substituted, or else $R_c$ and $R_d$ form, together with the carbon atoms of the imidazole ring to which they are attached, a ring optionally interrupted by one or more heteroatoms and/or substituted.

The expression "optionally interrupted by one or more heteroatoms and/or substituted" is understood to mean that the $R_a$, $R_c$ and $R_d$ groups may, independently and when they represent a hydrocarbon group, be interrupted by a heteroatom (i.e. in other words that a heteroatom is inserted in the hydrocarbon chain), preferentially selected from nitrogen, oxygen and sulfur, and/or substituted by a functional group. A functional group is understood to mean a group comprising a heteroatom, preferentially selected from amino, alkylamine, alkoxyl and hydroxyl groups, preferentially selected from hydroxyl and amino groups.

An amino group is understood to mean a group of formula —NH$_2$. A hydroxyl group is understood to mean a group of formula —OH.

Preferably, the imidazole of general formula (A) has groups such that:
  $R_a$ is selected from the group consisting of a hydrogen atom, alkyl groups having from 1 to 20 carbon atoms, cycloalkyl groups having from 5 to 24 carbon atoms, aryl groups having from 6 to 30 carbon atoms, aralkyl groups having from 7 to 25 carbon atoms, which are optionally substituted,
  $R_b$ is selected from the group consisting of alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms,
  $R_c$ and $R_d$ are independently selected from the group consisting of a hydrogen atom, alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which are optionally substituted, or else $R_c$ and $R_d$ form, together with the carbon atoms of the imidazole ring to which they are attached, a ring selected from aromatic, heteroaromatic or aliphatic rings, comprising from 5 to 12 carbon atoms, preferably 5 or 6 carbon atoms.

Preferentially, $R_a$ is selected from the group consisting of alkyl groups having from 2 to 12 carbon atoms and aralkyl groups having from 7 to 13 carbon atoms, which are optionally substituted. More preferentially, $R_a$ is selected from the group consisting of aralkyl groups having from 7 to 13 carbon atoms, which are optionally substituted, and $R_b$ is selected from the group consisting of alkyl groups having from 1 to 12 carbon atoms. More preferentially still, $R_a$ is selected from the group consisting of aralkyl groups having from 7 to 11 carbon atoms, which are optionally substituted and $R_b$ is selected from the group consisting of alkyl groups having from 1 to 4 carbon atoms.

Preferably, $R_c$ and $R_d$ are independently selected from the group consisting of a hydrogen atom and alkyl groups having from 1 to 12 carbon atoms, cycloalkyl groups having from 5 to 8 carbon atoms, aryl groups having from 6 to 24 carbon atoms and aralkyl groups having from 7 to 13 carbon atoms. Alternatively and also preferentially, $R_c$ and $R_d$ form, with the carbon atoms of the imidazole ring to which they are attached, a phenyl, cyclohexene, or cyclopentene ring.

Very preferably, $R_c$ and $R_d$ represent a hydrogen atom, $R_a$ and $R_b$ being selected as described above.

In a preferred arrangement, $R_a$ is a naphthylalkyl group comprising from 11 to 13 carbon atoms, optionally substituted by at least one hydroxyl group, $R_b$ is an alkyl group having from 1 to 4 carbon atoms, $R_c$ and $R_d$ are independently selected from the group consisting of a hydrogen atom and alkyl groups having from 1 to 12 carbon atoms. A naphthylalkyl group is understood to mean a group of general formula (A1), where n represents an integer between 1 and 3:

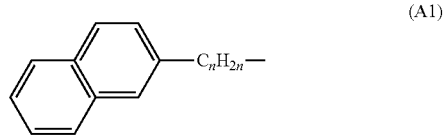

(A1)

Preferentially, $R_a$ is a naphthylalkyl group comprising from 11 to 13 carbon atoms substituted by at least one hydroxyl group, $R_b$ is an alkyl group having from 1 to 3 carbon atoms, $R_c$ and $R_d$ are a hydrogen atom. Very preferably, $R_a$ is a 2-naphthol-1-methyl group, $R_b$ is a methyl group, $R_c$ and $R_d$ are a hydrogen atom, compound (A) then corresponding to the formula (A2):

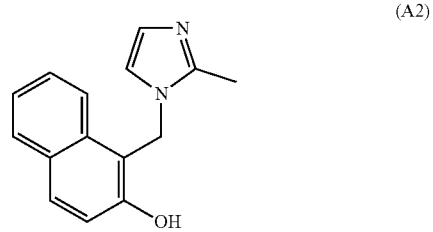 [SMILES: Cc1nccn1Cc1c(O)ccc2ccccc12]

(A2)

The rubber composition according to the invention preferentially comprises from 0.1 to 5 phr of imidazole of general formula (A), preferentially from 0.1 to 3 phr, very preferentially from 0.2 to 3 phr and very preferably from 0.2 to 2 phr of imidazole of general formula (A). Below these contents, the technical effect is not significant whereas above these contents the imidazole of general formula (A) could compete with the amine hardener and modify the network obtained during the crosslinking.

The imidazoles of use for the requirements of the invention are either commercially available or are easily prepared by a person skilled in the art according to well-known techniques, such as described, for example, in documents JP2012211122 and JP2007269658 or else in Science of Synthesis, 2002, 12, 325-528.

For example, mention may be made, as imidazoles which are commercially available and which are of use for the requirements of the invention, of 1,2-dimethylimidazole, 1-decyl-2-methylimidazole, 1-benzyl-2-methylimidazole or 1-((2-methyl-1H-imidazol-1-yl)methyl)naphthalen-2-ol commercially available under the name Aradur 3123 from Hunstman.

Reinforcing Filler

The composition of the tyre according to the invention preferentially comprises a reinforcing filler.

The reinforcing filler may comprise any type of reinforcing filler known for its ability to reinforce a rubber composition which can be used for the manufacture of tyres, for example an organic filler such as carbon black, a reinforcing inorganic filler such as silica, or a mixture of carbon black and reinforcing inorganic filler. More preferably, the reinforcing filler predominantly, indeed even exclusively, comprises carbon black, in particular in the case where the composition is used in an internal layer. The reinforcing filler can also predominantly comprise a reinforcing inorganic filler, in particular in the case where the composition is used in a tread.

Such a reinforcing filler typically consists of particles, the (weight-)average size of which is less than a micrometre, generally less than 500 nm, most often between 20 and 200 nm, in particular and more preferentially between 20 and 150 nm.

All carbon blacks, notably blacks of the HAF, ISAF or SAF type, conventionally used in tyres ("tyre-grade" blacks) are suitable as carbon blacks. Among the latter, mention will more particularly be made of the reinforcing carbon blacks of the 100, 200 or 300 series (ASTM grades), such as, for example, the N115, N134, N234, N326, N330, N339, N347 and N375 blacks, or else, depending on the applications targeted, the blacks of higher series (for example N660, N683 or N772). The carbon blacks might, for example, be already incorporated in an isoprene elastomer in the form of a masterbatch (see, for example, applications WO 97/36724 and WO 99/16600). The BET specific surface area of the carbon blacks is measured according to standard D6556-10 [multipoint (a minimum of 5 points) method—gas: nitrogen—relative pressure P/PO range: 0.1 to 0.3].

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to those skilled in the art, in particular any precipitated or fumed silica exhibiting a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area such as described in application WO 03/16837.

The BET specific surface area of the silica is determined in a known way by gas adsorption using the Brunauer-Emmett-Teller method described in "*The Journal of the American Chemical Society*", Vol. 60, page 309, February 1938, more specifically according to French standard NF ISO 9277 of December 1996 (multipoint (5 point) volumetric method—gas: nitrogen-degassing: 1 hour at 160° C.—relative pressure p/p0 range: 0.05 to 0.17). The CTAB specific surface area of the silica is determined according to French standard NF T 45-007 of November 1987 (method B).

Mineral fillers of the aluminous type, in particular alumina ($Al_2O_3$) or aluminium (oxide) hydroxides, or else reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of micropearls, of granules, of beads or any other appropriate densified form. Of course, "reinforcing inorganic filler" is also understood to mean mixtures of different reinforcing inorganic fillers, in particular of highly dispersible siliceous and/or aluminous fillers.

Those skilled in the art will understand that use might be made, as a filler equivalent to the reinforcing inorganic filler described in the present section, of a reinforcing filler of another nature, in particular of an organic nature, provided that this reinforcing filler is covered with an inorganic layer, such as silica, or else includes, at its surface, functional sites, especially hydroxyl sites, making it possible to establish the bond between the filler and the elastomer in the presence or absence of a covering or coupling agent.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Preferentially, the organosilanes are selected from the group consisting of organosilane polysulfides (symmetrical or asymmetrical) such as bis(3-triethoxysilylpropyl) tetrasulfide, abbreviated to TESPT sold under the name "Si69" by Evonik or bis(triethoxysilylpropyl)disulfide, abbreviated to TESPD sold under the name "Si75" by Evonik, polyorganosiloxanes, mercaptosilanes, blocked mercaptosilanes, such as S-(3-(triethoxysilyl)propyl) octanethioate sold by Momentive under the name "NXT Silane". More preferentially, the organosilane is an organosilane polysulfide.

The content of coupling agent is preferentially less than 12 phr, it being understood that it is generally desirable to use as little as possible of it. Typically, when a reinforcing inorganic filler is present, the content of coupling agent represents from 0.5% to 15% by weight, relative to the amount of inorganic filler. Its content is preferentially within a range extending from 0.5 to 12 phr, more preferentially within a range extending from 4 to 8 phr. This content is easily adjusted by those skilled in the art according to the content of inorganic filler used in the composition.

According to the invention, when the reinforcing filler is present, the content of reinforcing filler, preferably the reinforcing filler predominantly, indeed even exclusively, comprising carbon black, can be within a range extending from 20 to 200 phr, preferably from 30 to 150 phr, preferably from 40 to 100 phr, preferably from 50 to 80 phr.

Crosslinking System

The crosslinking system can be any type of system known to those skilled in the art in the field of rubber compositions for tyres. It can in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur, or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or else known vulcanization retarders.

The sulfur is used at a preferential content of between 0.5 and 12 phr, in particular between 1 and 10 phr. The vulcanization accelerator is used at a preferential content of between 0.5 and 10 phr, more preferentially of between 0.5 and 8.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazole-sulfenamide (CBS), N,N-dicyclohexyl-2-benzothiazole-sulfenamide (DCBS), N-(tert-butyl)-2-benzothiazole-sulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

Various Additives

The rubber compositions in accordance with the invention can also comprise all or a portion of the usual additives and processing agents, known to those skilled in the art and customarily used in rubber compositions for tyres, such as, for example, plasticizers (such as plasticizing oils and/or plasticizing resins), pigments, protective agents such as antiozone waxes, chemical antiozonants or antioxidants, and anti-fatigue agents.

The composition may be either in the raw state (before crosslinking or vulcanization), or in the cured state (after crosslinking or vulcanization).

Finished or Semi-Finished Rubber Article and Lyre

A subject of the present invention is also a finished or semi-finished rubber article comprising a composition according to the invention.

A subject of the present invention is also a tyre which comprises a composition according to the invention.

It is possible to define, within the tyre, three types of regions:

The radially exterior region in contact with the ambient air, comprising layers known as external layers, these layers essentially comprising the tread and the outer sidewall of the tyre. An outer sidewall is an elastomeric layer positioned outside the carcass reinforcement with respect to the internal cavity of the tyre, between the crown and the bead, so as to completely or partially cover the region of the carcass reinforcement extending from the crown to the bead.

The radially interior region in contact with the inflation gas, this region generally being composed of the layer airtight to the inflation gases, sometimes known as interior airtight layer or inner liner.

The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The composition defined in the present description is particularly well suited to the internal and external layers of the tyres, and in particular, for the external layers, to the tread compositions.

According to the invention, the internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of carcass plies, crown plies, bead-wire fillings, crown feet, decoupling layers and combinations of these internal layers.

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, heavy-duty vehicles, i.e. underground trains, buses, heavy road transport vehicles (lorries, tractors, trailers) or off-road vehicles, such as heavy agricultural vehicles or construction vehicles, and the like.

The invention relates to articles comprising a rubber composition according to the invention, both in the raw state (that is to say, before curing) and in the cured state (that is to say, after crosslinking or vulcanization).

Preparation of the Rubber Compositions

The rubber composition in accordance with the invention can be manufactured in appropriate mixers using two successive preparation phases well known to those skilled in the art:

a first phase of thermomechanical working or kneading ("non-productive" phase), which can be carried out in a single thermomechanical step during which all the necessary constituents, in particular the elastomeric matrix, the fillers and the optional other various additives, with the exception of the crosslinking system, are introduced into an appropriate mixer, such as a standard internal mixer (for example of 'Banbury' type). The incorporation of the filler in the elastomer can be carried out in one or more goes by thermomechanically kneading. In the case where the filler is already incorporated, in all or in part, in the elastomer in the form of a masterbatch, as is described, for example, in Applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated.

The non-productive phase is carried out at high temperature, up to a maximum temperature of between 110° C. and 190° C., preferably between 130° C. and 180° C., for a period of time generally of between 2 and 10 minutes.

a second phase of mechanical working ("productive" phase), which is carried out in an external mixer, such as an open mill, after cooling the mixture obtained during the first non-productive phase down to a lower temperature, typically of less than 110° C., for example between 40° C. and 100° C. The crosslinking system is then incorporated and the combined mixture is then mixed for a few minutes, for example between 2 and 15 min.

The process for preparing such compositions comprises, for example, the following steps:

a) incorporating a reinforcing filler in a diene elastomer during a first step ("non-productive" step), everything being kneaded thermomechanically (for example, in one or more goes), until a maximum temperature of between 110° C. and 190° C. is reached;

b) cooling the combined mixture to a temperature of less than 100° C.;

c) subsequently incorporating, during a second step ("productive" step), a crosslinking system;

d) kneading everything up to a maximum temperature of less than 110° C.

Between 1 and 30 phr of the epoxy resin, between 1 and 15 phr of an amine hardener and an imidazole of general formula (A) can be introduced, independently of one another, either during the non-productive phase (a) or during the productive phase (c). Preferably, the epoxy resin is introduced during the non-productive phase (a) whilst the amine hardener and the imidazole of general formula (A) are introduced during the productive phase (c).

The final composition thus obtained can then be calendered, for example in the form of a sheet or a slab in particular for characterization in the laboratory, or else extruded in the form of a rubber semi-finished product (or profiled element) used for the manufacture of a tyre.

The crosslinking of the composition may be carried out in a manner known to those skilled in the art, for example at a temperature between 130° C. and 200° C., under pressure.

In addition to the aforementioned subjects, the invention relates to at least one of the subjects described in the following points:

1. A rubber composition based on at least:
   a diene elastomer,
   a reinforcing filler,
   a crosslinking system,
   from 1 to 30 parts by weight, per hundred parts by weight of elastomer, phr, of an epoxy resin,
   between 1 and 15 phr of an amine hardener comprising at least two primary amine functions, located on at least one six-membered aromatic ring, said at least one six-membered aromatic ring comprising:
      at least one primary amine function, and
      at least two Ri radicals, which are identical or different, selected from the group consisting of linear or branched C1-C6 alkyl radicals, halogens, ethers, tertiary amines, thioethers, ketones, esters and amides, substituted by linear or branched C1-C6 alkyl radicals,
   so that the at least one six-membered aromatic ring does not comprise a hydrogen atom located in the ortho position with respect to the primary amine functions,
   an imidazole of general formula (A)

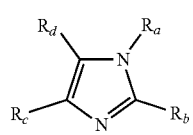

(A)

in which,
   $R_a$ represents a hydrogen atom or a hydrocarbon group, optionally interrupted by one or more heteroatoms and/or substituted,
   $R_b$ represents a hydrocarbon group,
   $R_c$ and $R_d$ represent, independently of one another, a hydrogen atom or a hydrocarbon group, optionally interrupted by one or more heteroatoms and/or substituted,
   or else $R_c$ and $R_d$ form, together with the carbon atoms of the imidazole ring to which they are attached, a ring optionally interrupted by one or more heteroatoms and/or substituted.

2. A rubber composition according to the preceding point, in which the diene elastomer is selected from the group consisting of polybutadienes, natural rubber, synthetic polyisoprenes, butadiene copolymers, isoprene copolymers, and mixtures of these elastomers.

3. A rubber composition according to point 1, in which the diene elastomer is an isoprene elastomer.

4. A rubber composition according to any one of the preceding points, in which the epoxy resin is selected from aromatic epoxy, alicyclic epoxy and aliphatic epoxy resins.

5. A rubber composition according to the preceding point, in which the aromatic epoxy resins are selected from the group consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)], aromatic amine epoxy resins and the mixtures of these compounds.

6. A rubber composition according to any one of the preceding points, in which the content of the epoxy resin is between 10 and 25 phr, preferably between 10 and 20 phr.

7. A rubber composition according to any one of the preceding points, in which the at least one six-membered aromatic ring of the amine hardener comprises at least two Ri radicals, which are identical or different, selected from the group consisting of linear or branched C1-C6 alkyl radicals, halogens and ethers, tertiary amines and thioethers, substituted by linear or branched C1-C6 alkyl radicals.

8. A rubber composition according to any one of the preceding points, in which the at least one six-membered aromatic ring of the amine hardener comprises at least two Ri radicals, which are identical or different, selected from the group consisting of linear or branched C1-C6 alkyl radicals.

9. A rubber composition according to any one of points 1 to 7, in which the at least one six-membered aromatic ring of the amine hardener comprises at least two Ri radicals, which are identical or different, selected from the group consisting of halogens and ethers, tertiary amines and thioethers, substituted by linear or branched C1-C6 alkyl radicals, and at least one Ri radical selected from the group consisting of linear or branched C1-C6 alkyl radicals.

10. A rubber composition according to any one of the preceding points, in which the linear or branched C1-C6 alkyl radicals are selected from the group consisting of the methyl, ethyl, propyl, isopropyl, isobutyl and butyl radicals, preferably from the group consisting of the methyl, ethyl and propyl radicals.

11. A rubber composition according to any one of the preceding points, in which the at least one six-membered aromatic ring is an aromatic ring comprising six carbon atoms.

12. A rubber composition according to any one of points 1 to 6, in which the amine hardener corresponds to the formula (I):

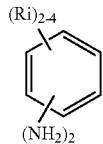

(I)

13. A composition according to the preceding point, in which the amine hardener corresponds to the formula (II):

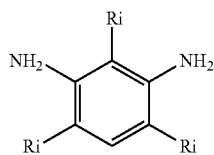

(II)

14. A rubber composition according to any one of points 1 to 11, in which the amine hardener corresponds to the formula (III):

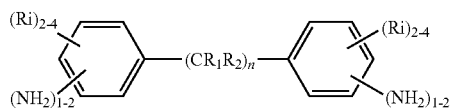

(III)

in which n represents an integer ranging from 0 to 4, preferably from 1 to 3, $R_1$ and $R_2$, which are identical or different, are selected from the group consisting of a hydrogen atom and a methyl, ethyl, isobutyl or benzyl group; preferably, $R_1$ and $R_2$ both represent a hydrogen atom.

15. A rubber composition according to the preceding point, in which the amine hardener corresponds to the formula (IV):

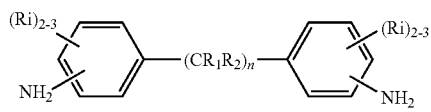

(IV)

in which n represents 1 or 2, preferably 1, $R_1$ and $R_2$, which are identical or different, are selected from the group consisting of a hydrogen atom and a methyl, ethyl, isobutyl or benzyl group; preferably, $R_1$ and $R_2$ both represent a hydrogen atom.

16. A rubber composition according to either one of points 14 and 15, in which the amine hardener corresponds to the formula (V):

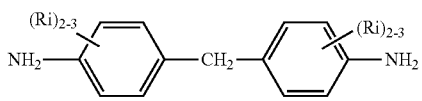

(V)

17. A rubber composition according to any one of points 1 to 11, in which the amine hardener is selected from the group consisting of the compounds below and the mixtures of these compounds:

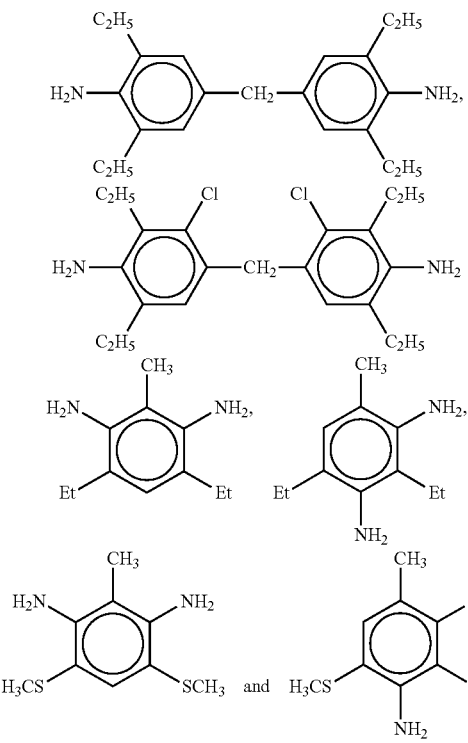

18. A rubber composition according to any one of the preceding points, in which the content of amine hardener is within a range extending from 5 to 10 phr, preferably from 2 to 8 phr.

19. A rubber composition according to any one of the preceding points, in which, in the imidazole of general formula (A):

$R_a$ is selected from the group consisting of a hydrogen atom, alkyl groups having from 1 to 20 carbon atoms, cycloalkyl groups having from 5 to 24 carbon atoms, aryl groups having from 6 to 30 carbon atoms, aralkyl groups having from 7 to 25 carbon atoms, which are optionally substituted, $R_b$ is selected from the group consisting of alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, $R_c$ and $R_d$ are independently selected from the group consisting of a hydrogen atom, alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which are optionally substituted, or else $R_c$ and $R_d$ form, together with the carbon atoms of the imidazole ring to which they are attached, a ring selected from aromatic, heteroaromatic or aliphatic rings, comprising from 5 to 12 carbon atoms, preferably 5 or 6 carbon atoms.

20. A rubber composition according to any one of the preceding points, in which, in the imidazole of general formula (A), $R_a$ is selected from the group consisting of alkyl groups having from 2 to 12 carbon atoms and aralkyl groups having from 7 to 13 carbon atoms, which are optionally substituted.

21. A rubber composition according to any one of the preceding points, in which, in the imidazole of general formula (A), $R_a$ is selected from the group consisting of aralkyl groups having from 7 to 13 carbon atoms, which are optionally substituted, and $R_b$ is selected from the group consisting of alkyl groups having from 1 to 12 carbon atoms.

22. A rubber composition according to any one of the preceding points, in which, in the imidazole of general formula (A), $R_a$ is selected from the group consisting of aralkyl groups having from 7 to 11 carbon atoms, which are optionally substituted and $R_b$ is selected from the group consisting of alkyl groups having from 1 to 4 carbon atoms.

23. A rubber composition according to any one of the preceding points, in which, in the imidazole of general formula (A), $R_c$ and $R_d$ are independently selected from the group consisting of a hydrogen atom and alkyl groups having from 1 to 12 carbon atoms, cycloalkyl groups having from 5 to 8 carbon atoms, aryl groups having from 6 to 24 carbon atoms and aralkyl groups having from 7 to 13 carbon atoms, $R_c$ and $R_d$ being very preferentially a hydrogen atom.

24. A rubber composition according to any one of points 1 to 22, in which, in the imidazole of general formula (A), $R_c$ and $R_d$ form, with the carbon atoms of the imidazole ring to which they are attached, a phenyl, cyclohexene, or cyclopentene ring.

25. A rubber composition according to any one of points 1 to 18, in which, in the imidazole of general formula (A), $R_a$ is a naphthylalkyl group comprising from 11 to 13 carbon atoms, optionally substituted by at least one hydroxyl group, $R_b$ is an alkyl group having from 1 to 4 carbon atoms, $R_c$ and $R_d$ are independently selected from the group consisting of a hydrogen atom and alkyl groups having from 1 to 12 carbon atoms.

26. A rubber composition according to the preceding point, in which $R_a$ is a naphthylalkyl group comprising from 11 to 13 carbon atoms substituted by at least one hydroxyl group, $R_b$ is an alkyl group having from 1 to 3 carbon atoms, $R_c$ and $R_d$ are a hydrogen atom, and in which preferentially $R_a$ is a 2-naphtholmethyl group, $R_b$ is a methyl group, $R_c$ and $R_d$ are a hydrogen atom, the compound (A) then corresponding to the formula (A2):

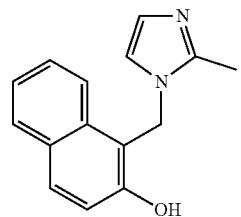

(A2)

27. A rubber composition according to any one of the preceding points, in which the content of imidazole of general formula (A) is within a range extending from 0.1 to 5 phr.

28. A rubber composition according to any one of the preceding points, in which the reinforcing filler comprises carbon black, a reinforcing inorganic filler or a mixture of carbon black and reinforcing inorganic filler, preferably in which the reinforcing filler comprises predominantly carbon black.

29. A rubber composition according to any one of the preceding points, in which the content of reinforcing filler is within a range extending from 20 to 200 phr, preferably from 30 to 150 phr.

30. A finished or semi-finished rubber article comprising a rubber composition according to any one of the preceding points.

31. A tyre comprising a rubber composition according to any one of points 1 to 27.

32. A tyre according to point 29, in which the rubber composition according to any one of points 1 to 27 is present in at least one internal layer.

33. A tyre according to point 30, in which the internal layer is selected from the group consisting of carcass plies, crown plies, bead-wire fillings, crown feet, decoupling layers, edge rubbers, padding rubbers, the tread underlayer and the combinations of these internal layers.

34. A tyre according to any one of points 29 to 31, in which the rubber composition according to any one of points 1 to 27 is present in at least one external layer.

The following examples illustrate the invention without limiting the scope thereof.

EXAMPLES

Measurements Used
Tensile Tests

The tests were carried out in accordance with French standard NF T 46-002 of September 1988. All the tensile measurements were carried out under the standard conditions of temperature (23±2° C.) and hygrometry (50±5% relative humidity), and also at higher temperature (100±2° C.) under the same hygrometry conditions, according to French standard NF T 40-101 (December 1979). The measurements at 23° C. and at 100° C. make it possible to evaluate the change in the stiffness of the material over a range covering the common operating range of the tyre.

At second elongation (that is to say after accommodation) the nominal secant modulus, calculated with respect to the initial cross section of the test specimen, (or apparent stress, in MPa) is measured at 10% elongation, denoted MA10, on samples cured for 60 minutes at 150° C.

The results are expressed in base 100, the value 100 being assigned to the control. A result of greater than 100 indicates that the composition of the example under consideration exhibits a greater stiffness.

Preparation of the Compositions

The tests which follow are carried out in the following way: the diene elastomer, the reinforcing filler, between 1 and 30 phr of the epoxy resin, and also the various other ingredients, with the exception of the vulcanization system, the amine hardener and the imidazole, are successively introduced into an internal mixer (final degree of filling: approximately 70% by volume), the initial vessel temperature of which is approximately 60° C. Thermomechanical working (non-productive phase) is then carried out in one step, which lasts in total approximately from 3 to 4 min, until a maximum "dropping" temperature of 165° C. is reached.

The mixture thus obtained is recovered and cooled and then sulfur, an accelerator of sulfenamide type, the amine hardener and the imidazole are incorporated on a mixer (homofinisher) at 30° C., everything being mixed (productive phase) for an appropriate time (for example between 5 and 12 min).

The compositions thus obtained are subsequently calendered, either in the form of slabs (thickness from 2 to 3 mm) or of thin sheets of rubber, for the measurement of their physical or mechanical properties, or extruded in the form of a profiled element.

The crosslinking of the composition is carried out at a temperature of 150° C., for 60 min, under pressure.

Example 1

Three rubber compositions were prepared as indicated above, two not in accordance with the invention (C.1 and C.2) and one in accordance with the invention (C.3). Their formulations (in phr) and their properties have been summarized in Table 1 below.

Compositions C.2 and C.3 contain an epoxy resin and a polyamine hardener as replacement for the phenol-formaldehyde resin/HMT hardener(s) pair present in the conventional control composition C.1.

With the exception of the control composition C.1, the compositions presented in Table 1 do not give rise to the formation of formaldehyde during the curing.

TABLE 1

|  | C.1 | C.2 | C.3 |
|---|---|---|---|
| NR (1) | 100 | 100 | 100 |
| Carbon black (2) | 75 | 75 | 75 |
| ZnO (3) | 8 | 8 | 8 |
| 6PPD (4) | 2 | 2 | 2 |
| Stearic acid (5) | 0.8 | 0.8 | 0.8 |
| Sulfur | 6 | 6 | 6 |
| CBS (6) | 1 | 1 | 1 |
| Phenol-formaldehyde resin (7) | 12 | | |
| H3M (8) | 4 | | |
| HMT3H (9) | 2.8 | | |
| Epoxy resin (10) | | 16 | 16 |
| Hardener (11) | | 3.1 | 3.1 |
| Imidazole (12) | | | 1 |
| Properties when cured | | | |
| MAS10% 23° C. (MPa) | 100 | 104 | 110 |
| MAS10% 100° C. (MPa) | 100 | 84 | 99 |

(1) Natural rubber
(2) Carbon black N326 (name according to standard ASTM D-1765)
(3) Zinc oxide (industrial grade - Umicore)
(4) N-1,3-dimethylbutyl-N-phenyl-para-phenylenediamine (Santoflex 6-PPD from Flexsys)
(5) Stearin (Pristerene 4931 from Uniqema)
(6) N-Cyclohexylbenzothiazolesulfenamide (Santocure CBS from Flexsys)
(7) Phenol/formaldehyde novolac resin (Peracit 4536K from Perstorp)
(8) Hexamethoxymethylmelamine
(9) Hexamethylenetetramine (from Degussa)
(10) Epoxy cresol novolac resin, Poly[(o-cresyl glycidyl ether)-co-formaldehyde], ref. 408042 from Sigma-Aldrich
(11) Aromatic diamine hardener, Ethacure 100 from Albemarle (CAS 68479-98-1)
(12) Imidazole, Aradur 3123 from Huntsman (CAS 185554-99-8)

It is noted that the composition in accordance with the invention has a stiffness at ambient temperature similar to the compositions C.1 and C.2, and has a stiffness at high temperature greater than the imidazole-free composition C.2, and similar to the composition C.1, while having the advantage relative to the latter of not forming formaldehyde during the curing.

Example 2

Ten rubber compositions were prepared as indicated above. Their formulations (in phr) and properties have been summarised in Table 2 below.

TABLE 2

|  | C.4 | C.5 | C.6 | C.7 | C.8 | C.9 | C.10 | C.11 | C.12 | C.13 |
|---|---|---|---|---|---|---|---|---|---|---|
| NR (1) | 100 | 100 | 100 | 100 | 100 | 100 | 100 | 100 | 100 | 100 |
| Carbon black (2) | 60 | 60 | 60 | 60 | 60 | 60 | 60 | 60 | 60 | 60 |
| ZnO (3) | 8 | 8 | 8 | 8 | 8 | 8 | 8 | 8 | 8 | 8 |
| 6PPD (4) | 2 | 2 | 2 | 2 | 2 | 2 | 2 | 2 | 2 | 2 |
| Stearic acid (5) | 0.6 | 0.6 | 0.6 | 0.6 | 0.6 | 0.6 | 0.6 | 0.6 | 0.6 | 0.6 |
| Sulfur | 6 | 6 | 6 | 6 | 6 | 6 | 6 | 6 | 6 | 6 |
| CBS (6) | 1 | 1 | 1 | 1 | 1 | 1 | 1 | 1 | 1 | 1 |
| Epoxy resin (7) | 16 | 16 | 16 | 12 | 12 | 16 | 16 | 12 | 12 | 16 |
| Hardener (8) | 1.9 | 3.6 | 1.9 | 1.4 | 1.4 | | | | | |

TABLE 2-continued

|  | C.4 | C.5 | C.6 | C.7 | C.8 | C.9 | C.10 | C.11 | C.12 | C.13 |
|---|---|---|---|---|---|---|---|---|---|---|
| Hardener (9) |  |  |  |  |  | 3.6 | 3.6 | 2.7 | 2.7 |  |
| Imidazole (10) |  |  | 0.5 |  | 0.5 |  | 0.5 |  | 0.5 | 0.5 |
| Cured properties |  |  |  |  |  |  |  |  |  |  |
| MAS10% 23° C. (MPa) | 100 | 106 | 116 | 80 | 91 | 126 | 132 | 90 | 93 | 102 |
| MAS10% 100° C. (MPa) | 100 | 101 | 131 | 85 | 123 | 173 | 202 | 133 | 146 | 108 |

(1) Natural rubber
(2) Carbon black N347 (name according to standard ASTM D-1765)
(3) Zinc oxide (industrial grade - Umicore)
(4) N-1,3-dimethylbutyl-N-phenyl-para-phenylenediamine (Santoflex 6-PPD from Flexsys)
(5) Stearin (Pristerene 4931 from Uniqema)
(6) N-Cyclohexylbenzothiazolesulfenamide (Santocure CBS from Flexsys)
(7) Epoxy cresol novolac resin, Poly[(o-cresyl glycidyl ether)-co-formaldehyde], ref. 408042 from Sigma-Aldrich
(8) Aromatic diamine hardener, Ethacure 100 from Albemarle (CAS 68479-98-1)
(9) Aromatic diamine hardener, Ethacure 300 from Albemarle (CAS 106264-79-3)
(10) Imidazole, Aradur 3123 from Huntsman (CAS 185554-99-8)

These tests illustrate that the addition of an imidazole makes it possible to improve the stiffness at high temperature. Test C.5 shows that solely increasing the amount of hardener makes it possible to increase the stiffness at low temperature but not the stiffness at high temperature. Test C.13 shows that the imidazole used without hardener does not make it possible to improve the stiffness at high temperature. It is therefore clearly the combination of the hardener and the imidazole that makes it possible to obtain both a satisfactory stiffness at ambient temperature and at high temperature.

The invention claimed is:

1. A rubber composition based on at least:
a diene elastomer;
a reinforcing filler;
a crosslinking system;
from 1 to 30 parts by weight, per hundred parts by weight of elastomer, phr, of an epoxy resin;
between 1 and 15 phr of an amine hardener comprising at least two primary amine functions, located on at least one six-membered aromatic ring, the at least one six-membered aromatic ring comprising:
at least one primary amine function, and
at least two Ri radicals, which are identical or different, selected from the group consisting of linear or branched C1-C6 alkyl radicals, halogens, ethers, tertiary amines, thioethers, ketones, esters, and amides, any of which can be substituted by linear or branched C1-C6 alkyl radicals,
so that the at least one six-membered aromatic ring does not comprise a hydrogen atom located in the ortho position with respect to the primary amine functions; and
an imidazole of general formula (A)

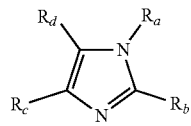

(A)

in which:
$R_a$ represents a naphthylalkyl group, optionally interrupted by one or more heteroatoms, optionally substituted, or both optionally interrupted by one or more heteroatoms and optionally substituted,
$R_b$ represents a hydrocarbon group,
$R_c$ and $R_d$ represent, independently of one another, a hydrogen atom or a hydrocarbon group, optionally interrupted by one or more heteroatoms, optionally substituted, or both optionally interrupted by one or more heteroatoms and optionally substituted,
or else $R_c$ and $R_d$ form, together with the carbon atoms of the imidazole ring to which they are attached, a ring optionally interrupted by one or more heteroatoms, optionally substituted, or both optionally interrupted by one or more heteroatoms and optionally substituted.

2. The rubber composition according to claim 1, wherein the diene elastomer is selected from the group consisting of polybutadienes, natural rubber, synthetic polyisoprenes, butadiene copolymers, isoprene copolymers, and mixtures thereof.

3. The rubber composition according to claim 1, wherein the epoxy resin is selected from aromatic epoxy, alicyclic epoxy and aliphatic epoxy resins.

4. The rubber composition according to claim 1, wherein the content of the epoxy resin is between 10 and 25 phr.

5. The rubber composition according to claim 1, wherein the at least one six-membered aromatic ring of the amine hardener comprises at least two Ri radicals, which are identical or different, selected from the group consisting of linear or branched C1-C6 alkyl radicals, halogens, ethers, tertiary amines, and thioethers, any of which may be substituted by linear or branched C1-C6 alkyl radicals.

6. The rubber composition according to claim 1, wherein the at least one six-membered aromatic ring of the amine hardener comprises at least two Ri radicals, which are identical or different, selected from the group consisting of linear or branched C1-C6 alkyl radicals.

7. The rubber composition according to claim 1, wherein the content of amine hardener is within a range extending from 5 to 10 phr.

8. The rubber composition according to claim 1, wherein, in the imidazole of general formula (A):
$R_b$ is selected from the group consisting of alkyl groups having from 1 to 20 carbon atoms, cycloalkyl groups having from 5 to 24 carbon atoms, aryl groups having from 6 to 30 carbon atoms, and aralkyl groups having from 7 to 25 carbon atoms, and
$R_c$ and $R_d$ are independently selected from the group consisting of a hydrogen atom, alkyl groups having from 1 to 20 carbon atoms, cycloalkyl groups having from 5 to 24 carbon atoms, aryl groups having from 6 to 30 carbon atoms, and aralkyl groups having from 7 to 25 carbon atoms, any of which are optionally substituted, or else $R_c$ and $R_d$ form, together with the carbon atoms of the imidazole ring to which they are attached, a ring selected from aromatic, heteroaromatic or aliphatic rings comprising from 5 to 12 carbon atoms.

9. The rubber composition according to claim 1, wherein, in the imidazole of general formula (A) $R_b$ is selected from the group consisting of alkyl groups having from 1 to 12 carbon atoms.

10. The rubber composition according to claim 1, wherein, in the imidazole of general formula (A), $R_c$ and $R_d$ are independently selected from the group consisting of a hydrogen atom, alkyl groups having from 1 to 12 carbon atoms, cycloalkyl groups having from 5 to 8 carbon atoms, aryl groups having from 6 to 24 carbon atoms, and aralkyl groups having from 7 to 13 carbon atoms.

11. The rubber composition according to claim 1, wherein a content of imidazole of general formula (A) is within a range extending from 0.1 to 5 phr.

12. The rubber composition according to claim 1, wherein a content of reinforcing filler is within a range extending from 20 to 200 phr.

13. A finished or semi-finished rubber article comprising a rubber composition according to claim 1.

14. A tire comprising a rubber composition according to claim 1.

15. The rubber composition according to claim 1, wherein, in the imidazole of general formula (A), $R_a$ is a 2-naphthol-1-methyl group.

* * * * *